(12) United States Patent
Knaapen et al.

(10) Patent No.: US 10,185,073 B2
(45) Date of Patent: Jan. 22, 2019

(54) PRODUCT HAVING A LUMINOUS SURFACE PROVIDED BY A LIGHT GUIDE

(71) Applicant: PHILIPS LIGHTING HOLDING B.V., Eindhoven (NL)

(72) Inventors: Bram Knaapen, Eindhoven (NL); Anthonie Hendrik Bergman, Nuenen (NL); Tim Dekker, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/653,584

(22) PCT Filed: Dec. 11, 2013

(86) PCT No.: PCT/IB2013/060814
§ 371 (c)(1),
(2) Date: Jun. 18, 2015

(87) PCT Pub. No.: WO2014/097058
PCT Pub. Date: Jun. 26, 2014

(65) Prior Publication Data
US 2016/0018585 A1  Jan. 21, 2016

Related U.S. Application Data

(60) Provisional application No. 61/738,448, filed on Dec. 18, 2012.

(51) Int. Cl.
*F21V 7/04* (2006.01)
*F21V 8/00* (2006.01)
(Continued)

(52) U.S. Cl.
CPC ......... *G02B 6/0041* (2013.01); *G02B 6/0008* (2013.01); *G02B 6/009* (2013.01);
(Continued)

(58) Field of Classification Search
CPC .. G09F 13/18; G09F 13/34; G09F 2013/1804; G09F 2013/1831;
(Continued)

(56) References Cited

U.S. PATENT DOCUMENTS 6,004,001 A * 12/1999 Noll .................. G01D 11/28
                                                          116/288
7,374,323 B1   5/2008 Kelman et al.
(Continued)

FOREIGN PATENT DOCUMENTS

CN  200956230 Y  10/2007
CN  101111704 A   1/2008
(Continued)

OTHER PUBLICATIONS

Espacenet English translation of document EP 0201791 A2.*

Primary Examiner — Evan Dzierzynski
Assistant Examiner — Omar Rojas Cadima
(74) Attorney, Agent, or Firm — Akarsh P. Belagodu (57) ABSTRACT

Disclosed is a product comprising a luminous surface, the product comprising a light guide (10) providing said luminous surface, said light guide comprising a plurality of scattering elements (12) for producing a substantially homogeneous light output across said luminous surface; and a first solid state lighting element (20) arranged to emit a beam of light (30) into the light guide; wherein the light guide further comprises a body (40) arranged to create a region (50) in the light guide shaded from said beam.

11 Claims, 8 Drawing Sheets

(51) Int. Cl.
*G09F 13/18* (2006.01)
*G09F 13/34* (2006.01)

(52) U.S. Cl.
CPC ......... *G02B 6/0061* (2013.01); *G02B 6/0068* (2013.01); *G02B 6/0091* (2013.01); *G09F 13/18* (2013.01); *G09F 13/34* (2013.01); *G09F 2013/1804* (2013.01); *G09F 2013/185* (2013.01); *G09F 2013/1831* (2013.01); *G09F 2013/1886* (2013.01)

(58) Field of Classification Search
CPC ....... G09F 2013/185; G09F 2013/1886; G02B 6/0091; G02B 6/0008; G02B 6/0041; G02B 6/0061; G02B 6/0068; G02B 6/009; B60K 35/00; B60K 2350/1064; B60K 2350/2017; B60K 2350/2086; B60K 37/02; B60K 2350/408; B60K 2350/1072; B60K 2350/2052; B60K 2350/403; G01D 13/18; G01D 13/265; Y10S 116/05
USPC ...... 362/23, 23.01, 27, 28, 29, 30, 613, 615, 362/460, 482, 508, 257
See application file for complete search history.

(56) References Cited

U.S. PATENT DOCUMENTS

| | | | |
|---|---|---|---|
| 7,388,813 B2* | 6/2008 | Su | G04B 19/34 362/231 |
| 7,448,341 B2* | 11/2008 | Cook | G01D 11/28 116/286 |
| 7,494,256 B1* | 2/2009 | Kelman | B60K 37/02 116/37 |
| 7,520,241 B2* | 4/2009 | Pala | B60K 37/02 116/288 |
| 7,748,148 B2 | 7/2010 | Reiland et al. | |
| 2001/0049893 A1* | 12/2001 | Maas | G02B 6/0036 40/544 |
| 2002/0001183 A1* | 1/2002 | Shigehiro | G01D 11/28 362/23.01 |
| 2003/0189819 A1* | 10/2003 | Furuya | G01D 13/28 362/23.2 |
| 2008/0173233 A1 | 7/2008 | Liu | |
| 2009/0109801 A1* | 4/2009 | Winkler | G04B 19/30 368/67 |
| 2010/0073960 A1 | 3/2010 | Yang | |
| 2012/0006253 A1* | 1/2012 | Demma | B60K 35/00 116/286 |
| 2012/0056738 A1* | 3/2012 | Lynam | B60R 1/1207 340/468 |
| 2012/0212931 A1* | 8/2012 | Kinoshita | G02B 6/0003 362/84 |

FOREIGN PATENT DOCUMENTS

| | | |
|---|---|---|
| DE | 202008017204 U1 | 4/2009 |
| EP | 0006361 A1 | 1/1980 |
| EP | 0201791 A2 * | 11/1986 ............ G04B 19/30 |
| EP | 1319553 A1 | 6/2003 |
| GB | 2481895 A | 1/2012 |
| JP | 61102990 U | 7/1986 |
| JP | 63161378 U | 10/1988 |
| JP | 3161923 U | 6/1996 |
| JP | 9281253 A | 10/1997 |
| JP | 2010134151 A | 6/2010 |

* cited by examiner

PRODUCT HAVING A LUMINOUS SURFACE PROVIDED BY A LIGHT GUIDE

CROSS-REFERENCE TO PRIOR APPLICATIONS

This application is the U.S. National Phase application under 35 U.S.C. § 371 of International Application No. PCT/IB2013/060814, filed on Dec. 11, 2013, which claims the benefit of U.S. Provisional Patent Application No. 61/738,448, filed on Dec. 18, 2012. These applications are hereby incorporated by reference herein.

FIELD OF THE INVENTION

The present invention relates to a product having a luminous surface, for example a lighting product, the product comprising a light guide defining said luminous surface, said light guide comprising a plurality of scattering elements for producing a substantially homogeneous light output across said luminous surface; and a first solid state lighting element arranged to emit light into the light guide.

BACKGROUND OF THE INVENTION

Solid state lighting elements such as light emitting diodes (LEDs) are increasingly being used in a plethora of products including lighting applications due to their low energy consumption and long lifetime. Such applications can be found in many technical areas, such as automotive applications, domestic lighting, commercial applications such as advertising, strip lighting in suspended ceilings and so on. Many more examples will be immediately apparent.

In several applications, the light of the solid state element is coupled into a light guide, where it is manipulated to create a particularly shaped light output.

For instance, U.S. Pat. No. 7,374,323 discloses a display device including a light guide connected to a surface comprising indicia formed thereon and a light-reflecting portion in the light guide disposed at least partially over one of the indicia to illuminate at least one of the indicia, which is used to illuminate indicia in an instrument panel of, for example, a vehicle.

EP 0 006 361 A1 discloses a dial board including light guiding plates that guide the light towards a reflective surface for focussing the light in the vicinity of an opening of the dial board through which spindle of a transparent pointer passes, thereby illuminating the transparent pointer.

JP 2010-134151 discloses light emitting display device in which a planar light guide receives light from LEDs mounted at a side of the light guide. The surface of the light guide comprises a plurality of shapes, which shapes are replicated inside the light guide by respective light emitting layers that extend deeper into the light guide as they are arranged further away from the LEDs. The light emitting layers extract light from the planar light guide and illuminate the shapes on its surface.

A particularly interesting application domain is diffuse lighting panels that produce a substantially homogenous light output over their luminous surface, and more particularly diffuse lighting panels that are transparent in the absence of light injected into the panels, such as the Acrylite® Endlighten sheet marketed by Evonik Industries AG (Essen, Germany), which is embedded with colourless light diffusing particles that scatter light entering an edge of the sheet such that a brightly and uniformly illuminated luminous surface is obtained.

It may be interesting from a functional or aesthetic point of view to create patterns in such a substantially homogeneously lit lighting product. However, the aforementioned prior art solutions all utilize some form of light extraction from a light guide to illuminate a body on the surface of the light guide, which is rather involved and detracts from the aesthetics of the light guide.

SUMMARY OF THE INVENTION

The present invention seeks to provide a product according to the opening paragraphs in which light patterns can be created without requiring a body on the surface of the light guide.

In accordance with an aspect of the present invention, there is provided a product having a luminous surface, the product comprising a light guide providing said luminous surface, said light guide comprising a plurality of scattering elements for producing a substantially homogeneous light output across said luminous surface; and a first solid state lighting element arranged to emit a beam of light into the light guide; wherein the light guide further comprises a body arranged to create a shaded region in the light guide by excluding said region from exposure to said beam.

By using a solid state lighting element having a light output that is collimated to a certain degree, i.e. has limited beam divergence, in combination with a body such as a reflective body, a black body, a colour filter, an outcoupling element or a combination thereof that blocks at least a part of the beam, a shaded region can be created in the light guide, which shaded region can be used to create patterns in the luminous surface, for example for aesthetic or functional purposes.

In an embodiment, the position of the first solid state lighting element relative to the light guide is adjustable. This allows for the shaded area to be displaced within the light guide such that dynamic patterns can be created within the light guide.

Alternatively or additionally, the product comprises a plurality of solid state lighting elements including the first solid state lighting element, each of said solid state lighting elements being arranged to emit a beam of light into the light guide, wherein the body is arranged to create respective shaded sections in the light guide by excluding said sections from exposure to said respective beams. Each of said solid state lighting elements may be individually controllable. This also allows for the creation of dynamic patterns within the light guide.

In an embodiment, the first solid state lighting element is adapted to emit light of a first colour, the plurality of solid state lighting elements further comprising a second solid state lighting element adapted to emit light of a second colour. This allows for shaded regions having a different colour to the remainder of the light guide to be formed as the colours are allowed to mix in the remainder of the light guide, but one or more of the colours may be excluded from the shaded region.

In an embodiment, a dynamic pattern is used for functional purposes, wherein the shaded region defines an indicator. Such an indictor may for instance be used as an indicator of, for example, time, such as the hand of a clock. The lighting product may further comprise a second solid state lighting element having an adjustable position relative to the light guide and being arranged to emit a further beam of light into the light guide such the body creates a further shaded region defining a further indicator in the light guide by excluding said further region from exposure to said further beam. A combination of such indicators can for instance be used to create a clock in the light guide.

The one or more solid state lighting elements may be arranged along one or more edges of the light guide. Alternatively, the solid state lighting element is mounted centrally in said light guide, and wherein the body surrounds the solid state lighting element, for example to create a radial pattern in the light guide.

This may for instance be achieved by a body comprising a plurality of apertures. For example, the body may comprise a plurality of curved mirrors spatially separated from each other by said apertures.

In the product of the present invention, the body may for instance be selected from a reflective body, a black body, a colour filter, an outcoupling element or a combination thereof.

It is not necessary that the body is directly lit by the at least one solid state lighting element. In an alternative embodiment, the light guide further comprises a reflective further body such as a mirror for redirecting said beam to the body.

It is also not necessary that the body is integrated in the light guide. In an alternative embodiment, the light guide comprises a cavity, said body being mounted in said cavity.

In an embodiment, the light guide further comprises a portion of a photoluminescent material (also referred to as a phosphor) for adjusting the colour of said beam. This may for instance be desirable if coloured effects are to be created in the light guide using white or blue light solid state lighting elements. Multiple portions of different phosphors may be used to create multiple colours in different locations in the light guide.

Preferably, the light guide has a high degree of transparency, such that in the off state, a background behind the light guide becomes visible, which enhances the aesthetic effect of the light product. A particularly suitable material for realizing such a highly transparent light guide is poly-(methylmethacrylate) (PMMA). The light guide may be an Acrylite® Endlighten sheet.

The product advantageously may be a lighting product such as a (diffuse) lighting panel or a three-dimensional lighting product.

BRIEF DESCRIPTION OF THE EMBODIMENTS

Embodiments of the invention are described in more detail and by way of non-limiting examples with reference to the accompanying drawings, wherein FIGS. 1 to 8 schematically depict various embodiments of the product of the present invention.

DETAILED DESCRIPTION OF THE DRAWINGS

It should be understood that the figures are merely schematic and are not drawn to scale. It should also be understood that the same reference numerals are used throughout the figures to indicate the same or similar parts.

Figure 1:
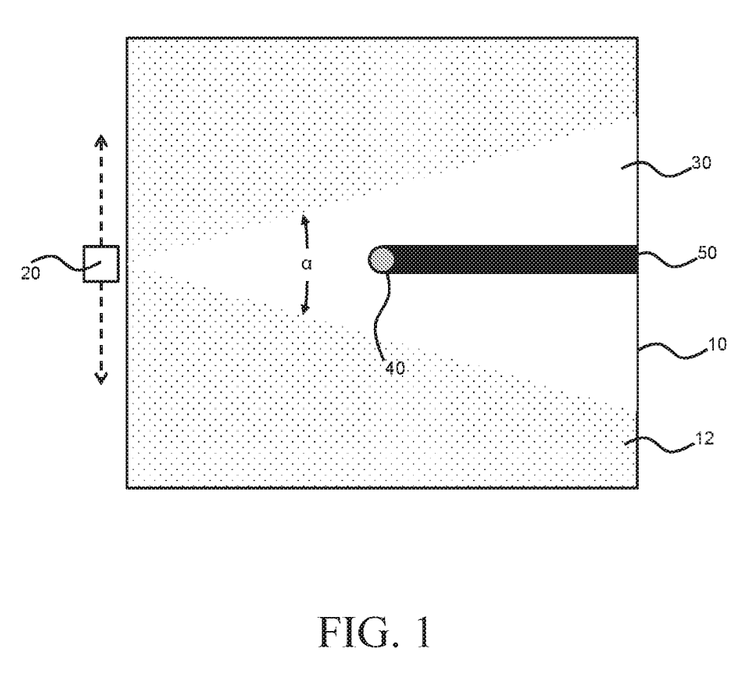

FIG. 1 shows an example embodiment of a product of the present invention. The product comprises a light guide 10 including a distribution of scattering elements 12, e.g. light diffusing particles for providing the product with a substantially homogeneously luminous surface. Such a homogenously luminous surface is for instance desirable in application domains where the product is a lighting product, e.g. wall-mounted lighting panels such as kitchen back panels, advertising consoles, e.g. poster panels, in commercial environments such as airports, shopping malls, restaurants, train stations, bus shelters and so on.

Preferably, the light guide 10 is of a highly transparent material such as PMMA. Non-limiting examples of suitable light guides 10 include the Acrylite® EndLighten range of products, in particular Acrylite® EndLighten T, which is highly transparent even in the absence of light emitted into the light guide 10. The scattering elements 12 preferably may also be transparent, although this is not necessary. An example of a suitable scattering material is $TiO_2$, although other suitable materials (for example ITO) will be apparent to the skilled person.

The product further comprises at least one solid state lighting element 20, which may be arranged in any suitable manner in order for the solid state lighting element 20 to couple light into the light guide 10. In the embodiment shown in FIG. 1, the solid state lighting element 20 is arranged alongside an edge of the light guide 10. The solid state lighting element 20 preferably comprises a light emitting diode although other types of solid state lighting elements may also be contemplated.

In an embodiment, the solid state lighting element 20 has a narrow angle beam with a beam angle α, to produce a near-collimated light beam 30 in the light guide 10, e.g. to prevent the entirety of the light guide 10 from becoming illuminated. For instance, α may be 40 degrees or less, 30 degrees or less or even 20 degrees or less. It is however not a prerequisite of the present invention that the solid state lighting element 20 has such a narrow angle beam 30, although it is preferable.

The light guide 10 further comprises a body 40 that is placed in the path of the beam 30, such that a section 50 of the light guide 10 is prevented from being directly illuminated by the solid state lighting element 20 despite being located within the profile of the beam 30. In the context of the present invention, such a section 50 will be referred to as a shaded section, but it should be understood that such a shaded section can still be a luminous section; it is merely shaded from the solid state lighting element 20 by the body 40.

The body 40 may be formed in the light guide 10 in any suitable manner. For instance, the body 40 may be integrated, e.g. moulded, into the light guide 10. Alternatively, the light guide 10 may comprise a recess in which the body 40 is formed. Such a recess may take any suitable shape, for example a hole, a slit and so on, and may be formed during or after the manufacture of the light guide 10, for example by drilling or (laser-)cutting.

The body 40 may take any suitable form and may create the shaded region 50 in any suitable manner. For instance, the body 40 may be a black body that absorbs the incident light beam 30. Alternatively, the body 40 may be a reflective body such as a mirror that redirects a portion of the beam 30 to create the shaded region 50. In another embodiment, the body 40 may be an outcoupling element, for example a hole in the light guide 10 to couple the incident portion of the beam 30 out of the light guide 10 to create the shaded region 50. In yet another embodiment, the body 40 may comprise a colour filter to filter out at least a part of the spectrum of the incident beam 30. In this embodiment, the shaded region 50 may have a different colour to the remainder of the beam 30. In yet another embodiment, the body 40 comprises a photoluminescent material (a phosphor) to create a region 50 having a different colour to the remainder of the beam 30. Multiple phosphors may be used to create multiple colours in the light guide 10. Advantageously, the solid state lighting element 20 may emit blue light, as blue light is particularly suitable for generating other colours using phosphors, although the solid state lighting element 20 may emit light of any suitable colour, for example white light. Other embodiments will be apparent to the skilled person.

In an embodiment, the position of the solid state lighting element 20 relative to the light guide 10 may be adjustable such that the shaded region 50 may be dynamically altered by adjusting the location of the solid state lighting element 20. In FIG. 1, the solid state lighting element 20 may for instance be translated along the edge of the light guide 10 to adjust the location of the beam 30 such that the shaded region 50 may appear in a different location within the beam 30. Any suitable arrangement may be used to make the position solid state lighting element 20 adjustable. As it is known per se to mount solid state lighting elements in an adjustable manner, this will not be explained in further detail for the sake of brevity only.

In FIG. 1, a single solid state lighting element 20 is shown by way of non-limiting example only. It should be understood that a plurality of solid state lighting elements 20 may be arranged alongside one or more of the edges of the light guide 10. At least some of the multiple solid state lighting elements 20 may be controlled individually, such that shaded regions 50 can be created in different locations of the light guide 10 by switching on/off the individual solid state lighting elements 20. Different solid state lighting elements 20 may emit light of different colours to create dynamic colour effects in the light guide 20. The light guide 20 may further comprise a plurality of bodies 40 to interact with one or more beams 30 from the one or more solid state lighting elements 20.

Figure 2:
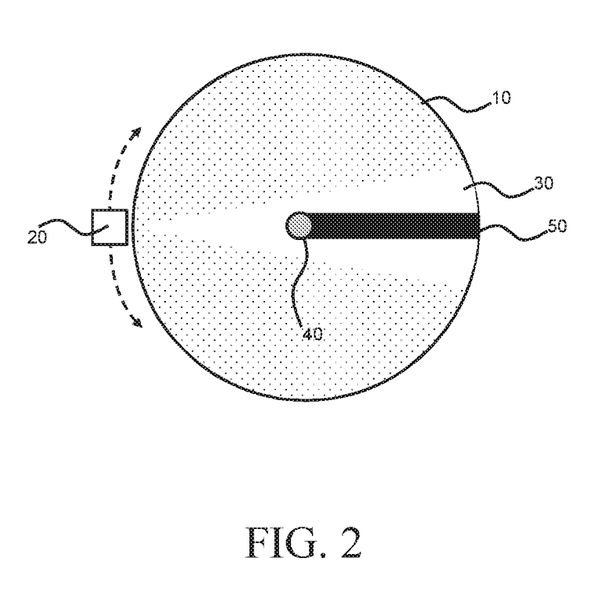

In FIG. 1, the light guide 10 has a rectangular shape by way of non-limiting example only. The light guide may adopt any suitable shape. An alternative example embodiment is shown in FIG. 2, in which the light guide 10 has a circular shape. The solid state lighting element 20 may be mounted in an adjustable manner along the edge of the light guide 10 such that the shaded region 50 created in the beam 30 by the body 40 may be utilized as an indicator. In this embodiment, the light guide 10 may represent a dial, for example as part of a measuring instrument, which may be mounted in an instrument panel, in which case the adjustable position of the solid state lighting element 20 is determined by the measured quantity of the unit of interest, such as time, speed, pressure, temperature and so on.

Figure 3:
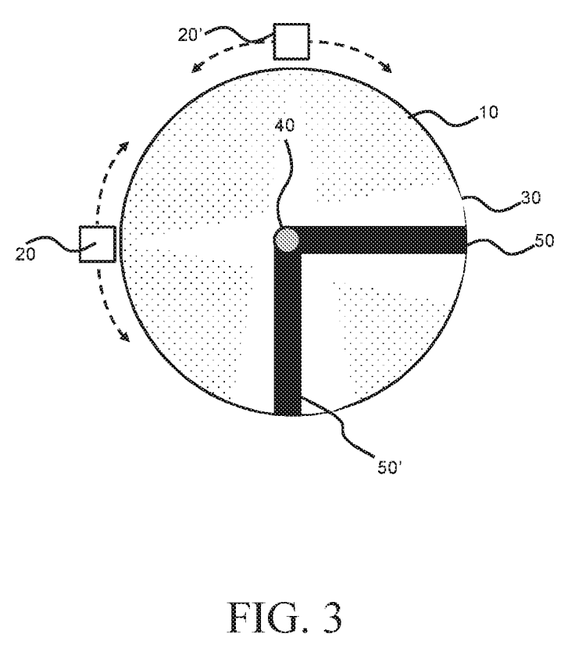

FIG. 3 shows an example embodiment in which a central body 40 in a light guide 10 is used to create a clock. A first solid state lighting element 20 and a second solid state lighting element 20' are adjustably mounted along the edge of the light guide 10, such that a shaded region 50 in the beam 30 of the first solid state lighting element 20 defines a first indicator or hand of the clock and shaded region 50' in the beam 30' of the first solid state lighting element 20' defines a second indicator or hand of the clock.

Figure 4:
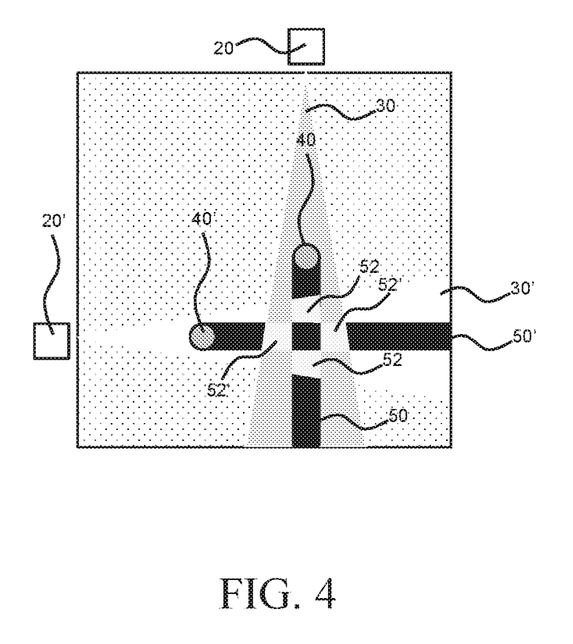

FIG. 4 shows an example embodiment in which regions of different colours are created in the light guide 10 using the concept of the present invention. A first solid state lighting element 20 producing a beam 30 having a first colour and a second solid state lighting element 20' producing a beam 30' having a second colour that is different to the first colour are mounted along different edges of the light guide 10. The first solid state lighting element 20 and the second solid state lighting element 20' may be individually controllable and/or adjustably mounted along the edges of the light guide 10, although this is not indicated in FIG. 4.

The light guide 10 comprises a first body 40 for blocking part of beam 30 and a second body for blocking a part of beam 30'. The beams 30 and 30' intersect in a region of the light guide 10, where the different colours of the beams 30 and 30' will mix to define a third colour. However, within this intersection, the light from the first solid state lighting element 20 will be excluded from regions 52 by the first body 40, such that the colour of these regions will be dominated by the second colour of the second beam 30', whereas the light from the second solid state lighting element 20' will be excluded from regions 52' by the second body 40', such that the colour of regions 52' will be dominated by the first colour of the first beam 30'. By shaping the beams 30, 30' and the bodies 40, 40', the regions 52, 52' as well as the intersection between the beams 30, 30' may be shaped in any suitable manner, i.e. any suitable pattern may be created in this fashion. Although FIG. 4 depicts an embodiment with two solid state lighting elements 20, 20' and two bodies 40, 40', it should be understood that this concept may be extended to any suitable number of solid state lighting elements 20 and bodies 40, such that any suitable number of colour combinations and shapes may be created in this manner.

Figure 5:
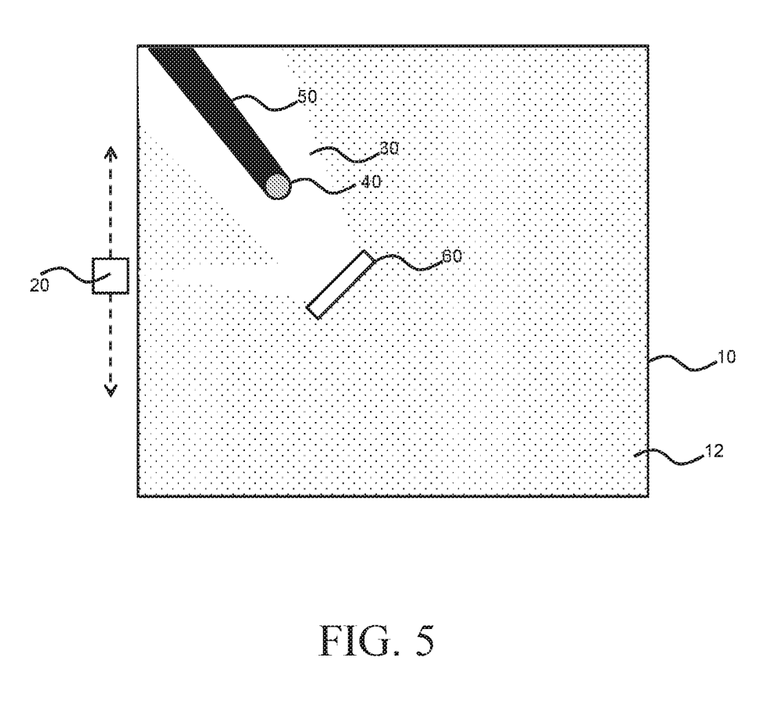

FIGS. 1 to 4 depict embodiments of the product of the present invention in which a body 40 is directly lit by a solid state lighting element 20. However, it is emphasized that this is by way of non-limiting example only. For instance, as shown in FIG. 5, the light guide 10 may further comprise a reflective element such as a mirror 60 to redirect the beam 30 from the solid state lighting element 20 onto the body 40 to create the shaded region 50. As before, the solid state lighting element 20 may be mounted in an adjustable manner respective to the light guide 10.

Figure 6:
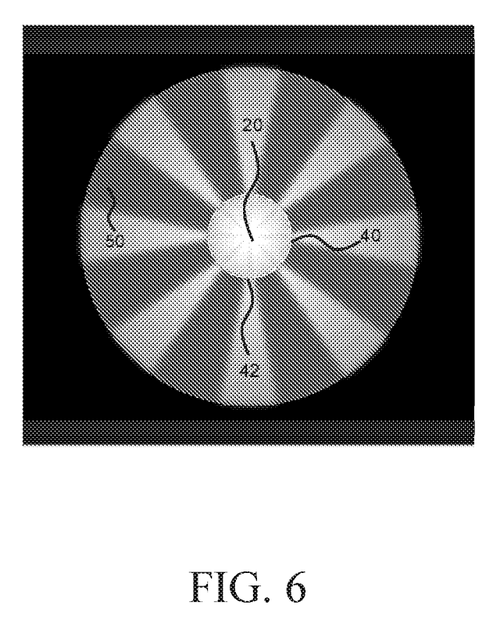

In FIGS. 1 to 5, the one or more solid state lighting elements 20 have been placed along an edge of the light guide 10 by way of non-limiting example only. FIG. 6 depicts an alternative embodiment in which the solid state lighting element 20 is mounted centrally in the light guide 10, for example inside a hole drilled or cut into the light guide 10, with the body 40 surrounding the solid state light element 20. In this embodiment, the body 40 comprises an annular concave mirror subdivided by apertures 42 such that the light generated by the solid state lighting element 20 is reflected inside the cavity defined by the body 40 and escapes said cavity through the apertures 42 only, such that a radial illumination pattern is formed in the light guide 10 in which shaded regions 50 are formed behind the mirror portions of the body 40.

Figure 7:
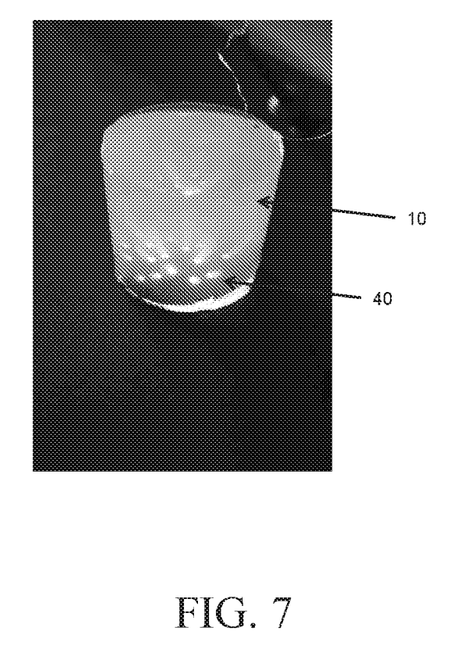

The product of the present invention is furthermore not limited to planar light guides 10, for example lighting sheets. FIG. 7 shows an example embodiment of a lighting product of the present invention in which the lighting guide 10 defines a three-dimensional (i.e. non-planar) volume including a distribution of scattering elements, such as $TiO_2$ particles, throughout the volume, in which the solid state lighting element (not shown) is separated from the bulk of the light guide material by a body 40 comprising a plurality of apertures through which the light emitted by the solid state lighting element can enter the light guide 10, thereby giving the effect of light beams within the light guide 10 as shown in FIG. 7.

Figure 8:
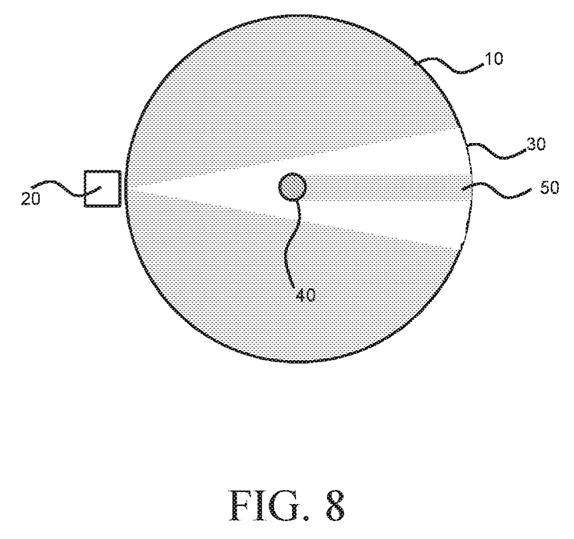

Another embodiment of a product of the present invention is shown in FIG. 8, in which the light guide 10 is isotropically illuminated by a light source (not shown) in a first colour, for example orange light, with the solid state lighting element 20 emitting light of a second colour, for example blue light, such that a white light beam 30 is created in the light guide 10 due to the mixing of the orange and blue light. However, due to the exclusion of the blue light from the shaded region 50 created by the body 40, the shaded region 50 will be orange as only the isotropic illumination is present in this region.

In summary, the present invention is based on the insight that in a light guide that can be homogenously illuminated, light effects can be created in the light guide by the partial blocking of an incident beam from a solid state light element by a body in the light guide. Some non-limiting examples of such light effects have been shown in FIGS. 1 to 8, but it will of course be apparent to the skilled person that numerous variations and enhancements of the disclosed light effects can be achieved using the teachings of the present invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting panel having a luminous surface, the lighting panel comprising:
    a light guide providing the luminous surface, the light guide comprising a plurality of scattering elements for producing a substantially homogeneous light output across the luminous surface; and
    a plurality of solid state lighting elements, each of the solid state lighting elements being arranged along one or more edges of the light guide to emit a beam of light into the light guide, each of the solid state lighting elements having a light output that is partially collimated, wherein the plurality of solid state lighting elements comprises a first solid state lighting element, and a position of the first solid state lighting element is adjustable relative to the light guide;
    wherein the light guide further comprises a first body within the light guide, the first body arranged to create respective regions in the luminous surface that are shaded from the respective beams of light, at least one shaded region arranged within the beam of light, the respective shaded regions with the light output from the plurality of solid state light elements arranged to create light effects.

2. The lighting panel of claim 1, wherein each of the solid state lighting elements is individually controllable.

3. The lighting panel of claim 1, wherein the plurality of solid state lighting elements comprises at least one solid state lighting element that is adapted to emit light of a first colour, and wherein the plurality of solid state lighting elements further comprises at least another solid state lighting element that is adapted to emit light of a second colour.

4. The lighting panel of claim 3, wherein the first colour is different than the second colour and the different colours of the beams mix to define a third colour.

5. The lighting panel of claim 1, comprising a plurality of bodies including the first body, for creating a plurality of regions in the light guide, each of the plurality of regions being shaded from a beam of light.

6. The lighting panel of claim 1, wherein the first body is selected from the group consisting of a reflective body, a black body, a colour filter, an outcoupling element and any combination thereof.

7. The lighting panel of claim 1, wherein the light guide further comprises a reflective body for redirecting at least one of the beams of light to the first body.

8. The lighting panel of claim 1, wherein the light guide comprises a cavity, the first body being mounted in the cavity.

9. The lighting panel of claim 1, wherein the light guide further comprises a portion of a photoluminescent material for adjusting the colour of at least one of the beams of light.

10. The lighting panel of claim 1, wherein the light guide is transparent such that a background behind the light guide is visible in an off-state of the lighting panel.

11. A lighting panel having a luminous surface, the lighting panel comprising:
    a light guide providing the luminous surface, the light guide comprising a plurality of scattering elements for producing a substantially homogeneous light output across the luminous surface, the light guide further comprising a first body within the light guide; and
    a plurality of solid state lighting elements, each of the solid state lighting elements being arranged along one or more edges of the light guide to emit a beam of light into the light guide, each of the solid state lighting elements having a light output that is partially collimated;
    wherein the first body is arranged to create respective regions in the luminous surface that are shaded from the respective beams of light, at least one shaded region arranged within the beam of light, the respective shaded regions with the light output from the plurality of solid state light elements arranged to create light effects, and
    wherein the plurality of solid state lighting elements comprises a first solid state lighting element arranged to emit a first beam of light into the light guide such that the first body creates a first region defining a first indicator in the light guide by shading the first region from the first beam of light, and wherein the plurality of solid state lighting elements comprises a second solid state lighting element having an adjustable position relative to the light guide and being arranged to emit a second beam of light into the light guide such that the first body creates a second region defining a second indicator in the light guide by shading the second region from the second beam of light.

* * * * *